US00RE35131E

United States Patent [19]

Youell, Jr. et al.

[11] E Patent Number: Re. 35,131

[45] Reissued Date of Patent: Dec. 26, 1995

[54] PAPERBOARD RUNNERS AND PAPERBOARD PALLETS CONSTRUCTED THEREWITH

[75] Inventors: Donald R. Youell, Jr.; Donald R. Youell, III, both of Dublin, Ohio

[73] Assignee: American Corrugated Products, Inc., Columbus, Ohio

[21] Appl. No.: 349,008

[22] Filed: Dec. 2, 1994

Related U.S. Patent Documents

Reissue of:

[64] Patent No.: 5,222,444
Issued: Jun. 29, 1993
Appl. No.: 827,723
Filed: Jan. 29, 1992

[51] Int. Cl.[6] ..... B65D 19/00

[52] U.S. Cl. ..... 108/51.3

[58] Field of Search ..... 108/51.1, 51.3

[56] References Cited

U.S. PATENT DOCUMENTS

| | | | |
|---|---|---|---|
| 2,997,266 | 8/1961 | Munroe | 248/120 |
| 3,000,603 | 9/1961 | Hemann | 248/120 |
| 3,601,067 | 8/1971 | Olsen | 108/51 |
| 3,602,158 | 8/1971 | Skaggs | 108/56 |
| 3,659,534 | 5/1972 | Childs | 108/56 |
| 4,100,859 | 7/1978 | Clark, Jr. | 108/51.3 |
| 4,303,020 | 12/1981 | Houle | 108/51.3 |
| 4,563,377 | 1/1986 | Melli | 428/36 |
| 4,714,026 | 12/1987 | Yamaguchi et al. | 108/51.1 |
| 4,802,421 | 2/1989 | Atterby et al. | 108/51.1 |
| 4,936,229 | 6/1990 | Parnell | 108/51.3 |
| 5,001,991 | 3/1991 | Smith | 108/51.3 |

FOREIGN PATENT DOCUMENTS 569101 1/1959 Canada .

*Primary Examiner*—Kenneth J. Dorner
*Assistant Examiner*—Gerald A. Anderson
*Attorney, Agent, or Firm*—Mueller and Smith

[57] ABSTRACT

Broadly, the present invention is directed to paperboard runners and paperboard pallets constructed therewith. One aspect of the invention comprises a paperboard pallet comprising an upper deck and a lower deck having a plurality of runners interposed therebetween and affixed to each of said decks. Each of the runners comprises a sheet of paperboard that has been folded into a rectangular form having top and bottom walls, a pair of sidewalls, and a central vertical wall (e.g., the two ends of the sheet pressed together) interposed between the sidewalls. The top wall has openings. The central wall has quarter-round cut-outs located at the longitudinal ends of the top wall cut-out areas. The top wall openings are adapted to receive flaps having central slots cut in them. The flaps are selected from: flaps formed from said runner top wall; flaps cut from an upper deck attached to said runner; or flaps formed from a rectangular insert which has a pair of end slotted flaps, which insert fits into said top wall opening with said end slotted flaps folding downwardly into said quarter-round cut-outs. Another aspect of the present invention comprises the runners described herein.

A further aspect of the present invention is an alternate paperboard runner which comprises a sheet of paperboard that has been folded into a rectangular form by one end being folded to form a first bottom wall, a first sidewall, a first top wall, and a second sidewall; and the other end being folded into an "S" configuration to form a central vertical wall, a part second top wall which lays against said first top wall, and a part second bottom wall which lays against said first bottom wall. The top wall has openings. The central vertical wall has quarter-round cut-outs located at the longitudinal ends of said top wall cutout areas. The top wall openings are adapted to receive flaps which have central slots cut in them. The flaps are selected from: flaps formed from said runner top wall; flaps cut from an upper deck attached to said runner; or flaps formed from a rectangular insert which has a pair of end slotted flaps which insert fits into said top wall opening with said end slotted flaps folding downwardly into said quarter round cut-outs. This paperboard pallet embodiment can be made collapsible for shipment and storage, yet it can be simple and quickly assembled into a strong, lightweight, disposable pallet.

17 Claims, 6 Drawing Sheets

PAPERBOARD RUNNERS AND PAPERBOARD PALLETS CONSTRUCTED THEREWITH

Matter enclosed in heavy brackets [ ] appears in the original patent but forms no part of this reissue specification; matter printed in italics indicates the additions made by reissue.

BACKGROUND OF THE INVENTION

The present invention generally relates to pallets and more particularly to an improved paperboard pallet made using novel paperboard runners.

Pallets have been made for many years completely of wood and such pallets ordinarily are re-used a number of times. Thereafter, however, the wood pallets must be disposed of in an acceptable manner. This disposal problem is magnified when large assembly plants, e.g. automobile assembly plants, are considered since thousands of wood pallets must be disposed of in an acceptable manner.

The art, then, has turned to disposable pallets made of corrugated paper. Such paperboard pallets, however, have not been found to be generally satisfactory, being deficient in areas including lateral stability and cost. Moreover, such paperboard pallets must be capable of being moved by conventional forklift trucks.

Such prior paperboard pallets can be exemplified by U.S. Pat. No. 2,997,266 which proposes a pallet structure wherein U-shaped wood block members provide structural rigidity to each of the paperboard beams. U.S. Pat. No. 3,000,603, calls for tabs to be inserted into rectangular openings in the beams and engage slots in a central vertical wall. U.S. Pat. No. 3,601,067 utilizes reinforced legs and collars for the pallet structure. U.S. Pat. No. 3,659,534 provides for S-shaped folds at the end of each sheet in order to provide structure for the pallet. U.S. Pat. No. 4,100,859 utilizes "egg-carton" type inserts for providing rigidity to the forklift pallet. U.S. Pat. No. 4,303,020 utilizes wood stiffening elements in the paperboard pallet while U.S. Pat. No. 4,563,377 provides a folded beam structure. U.S. Pat. No. 4,714,026 provides blocks for reinforcing the beams that support the pallet. U.S. Pat. No. 4,802,421 provides circular cross elements for stiffening of the lateral beams. U.S. Pat. No. 4,936,229 provides for a grid of slotted vertical members for providing rigidity to the pallet. U.S. Pat. No. 5,001,991 provides a cross beam structure of folded cardboard for construction of a pallet.

Despite the art on paperboard pallets, load bearing capability, lateral deflection strength, and economy of cost are a combination of factors that have eluded the art. Moreover, a truly collapsible paperboard pallet has yet to be proposed.

BROAD STATEMENT OF THE INVENTION

Broadly, the present invention is directed to paperboard runners and paperboard pallets constructed therewith. One aspect of the invention comprises a paperboard pallet comprising an upper deck and a lower deck having a plurality of runners interposed therebetween and affixed to each of said decks. Each of the runners comprises a sheet of paperboard that has been folded into a rectangular form having top and bottom walls, a pair of sidewalls, and a central vertical wall (e.g., the two ends of the sheet pressed together) interposed between the sidewalls. The top wall has cut-out areas or openings. The central wall has quarter-round cut-outs located at the longitudinal ends of the top wall cut-out areas.

The top wall cut-out areas are adapted to receive flaps having central slots cut in them. The flaps are selected from: flaps formed or cut from said runner top wall; flaps formed or cut from an upper deck attached to said runner; or flaps cut from a rectangular insert which has a pair of end slotted flaps, which insert fits into said top wall cut-out with said end slotted flaps folding downwardly into said quarter-round cut-outs. Another aspect of the present invention comprises the runners described herein.

A further aspect of the present invention is an alternate paperboard runner which comprises a sheet of paperboard that has been folded into a rectangular form by one end being folded to form a first bottom wall, a first sidewall, a first top wall, and a second sidewall; and the other end being folded into an "S" configuration to form a central vertical wall, a part second top wall which lays against said first top wall, and a part second bottom wall which lays against said first bottom wall. The top wall has cut-out areas or openings. The central vertical wall has quarter-round cut-outs located at the longitudinal ends of said top wall cut-out areas. The top wall cut-out areas are adapted to receive flaps which have central slots cut in them. The flaps are selected from: flaps formed or cut from said runner top wall; flaps formed or cut from an upper deck attached to said runner; or flaps cut from a rectangular insert which has a pair of end slotted flaps which insert fits into said top wall cut-out with said end slotted flaps folding downwardly into said quarter round cut-outs. This paperboard pallet embodiment can be made collapsible for shipment and storage, yet it can be simple and quickly assembled into a strong, lightweight, disposable pallet.

Yet another paperboard pallet embodiment comprises a sheet of paperboard that has been folded into a rectangular form having top and bottom walls, a pair of sidewalls, and a central vertical wall interposed between said sidewalls. The top wall has cut-out areas or openings. The central wall has slots located at the longitudinal ends of said top wall cut-out areas. The top wall cut-out areas are adapted to receive a U-shaped insert which has a pair of end slotted flaps, which insert fits into said top wall cut-out area with said end slotted flaps folding downwardly into said central wall slots.

Advantages of the present invention include paperboard pallets that are inexpensive to produce. A further advantage are paperboard pallets that can bear heavy loads, yet still possess lateral stability. Another advantage is a paperboard pallet construction that is collapsible for storage and shipment, yet which can be assembled rapidly and easily for use. Yet a further advantage are paperboard pallets which can be readily and environmentally recycled. These and other advantages will become readily apparent to those skilled in the art based upon the disclosure contained herein.

The drawings will be described in detail below.

DETAILED DESCRIPTION OF THE INVENTION

Figure 1:
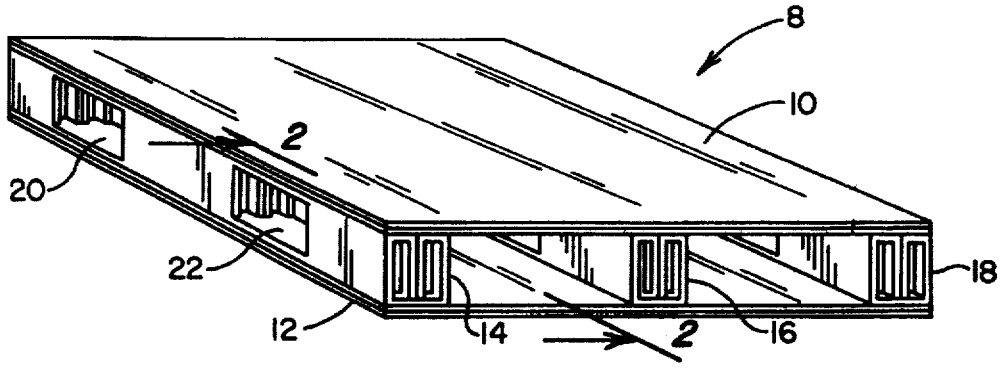
FIG. 1 is a top perspective view of one embodiment of the pallet of the present invention.

The basic paperboard pallet construction of pallet 8 can be seen in FIG. 1 to be composed of top wall 10, bottom wall 12, and paperboard runners 14, 16, and 18 which are interposed between sheets 10 and 12 and are affixed thereto, preferably by application of adhesive. While three paperboard runners are shown in the pallet of FIG. 1, it will be appreciated that, depending upon the size and load requirements, a fewer number (e.g. 2) or a greater number of paperboard runners could be used. It will be observed that the space formed between runners 14 and 16, and runners 16 and 18 provides access for a forklift truck to engage pallet 8 for lifting and moving it. In this regard, also, it will be appreciated that pallet runner 14 has openings 20 and 22 for converting the pallet into a four-way entry pallet; thus, permitting the forklift operator to access the pallet from any direction (similar openings being made in runner 18 which openings are not shown in the drawings). Runner 16 has openings 21 and 23 (FIG. 4), though the forks of the forklift may not reach such openings. By providing all runners with such side openings, any runner can be placed at any exterior or interior position between decks 10 and 12.

Figure 2:
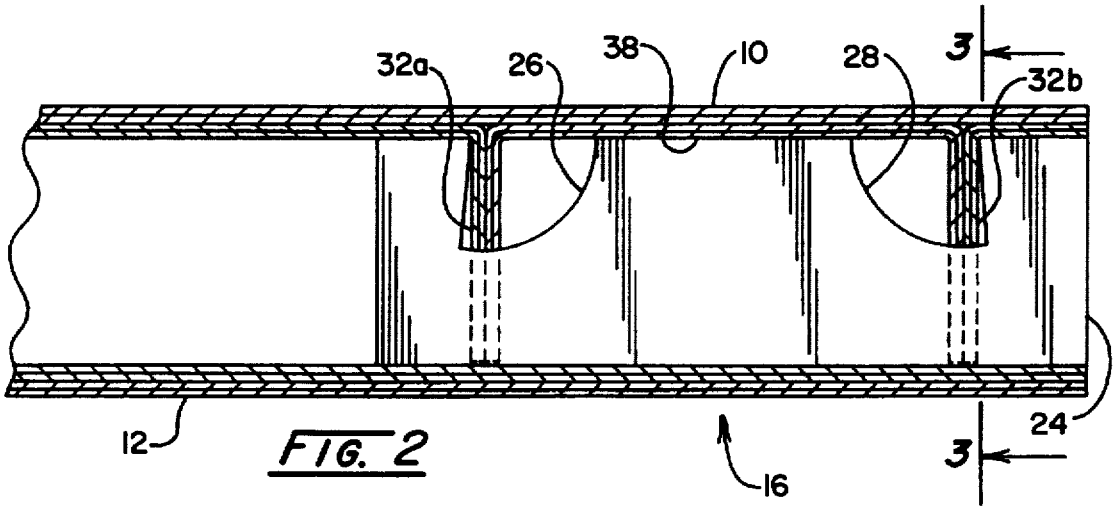
FIG. 2 is a cross-sectional elevational view taken along line 2—2 of FIG. 1.

With respect to the paperboard runners themselves, the following description is of runner 16, though the description is illustrative of runners 14 and 18. With respect to FIGS. 1–3, it will be seen that runner 16 is formed from double-wall paperboard as are top deck 10 and bottom deck 12. In this regard, it will be appreciated that all of the components may be constructed from single-wall paperboard, double-wall paperboard, or higher wall construction. In fact, different components can be constructed from paperboard of different thicknesses, depending upon requirements of the components. Thus, the number of plies of paperboard referred to herein is by way of illustration and not limitation.

Figure 3:
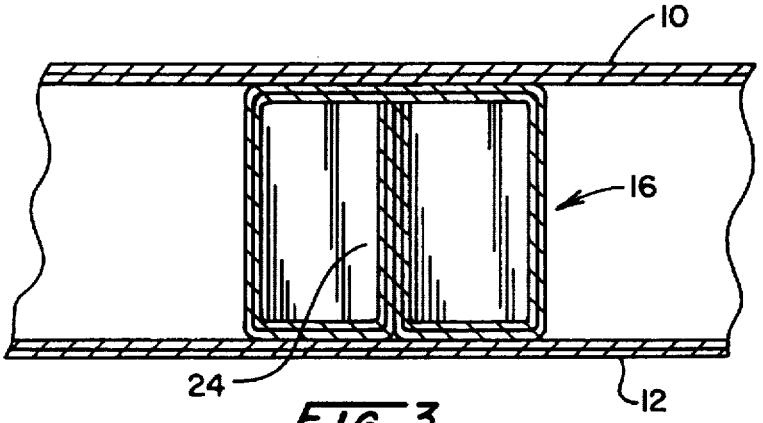
FIG. 3 is a cross-sectional elevational view taken along line 3—3 of FIG. 2.

The sheet from which runner 16 is made (FIG. 5) is suitably scored and folded to produce the structure depicted at FIG. 3 wherein each of the ends (e.g., ends 25 and 27) mates to form vertical, central wall 24. Sidewalls 29 and 31 and top wall 33 are continuously formed while bottom wall 35 is composed of two individual segments in abutting relationship. Additionally, FIG. 2 reveals quarter-round cut-outs, i.e. 26 and 28, in central wall 24 of runner 16. It, further, will be appreciated from FIG. 2 that an opening, e.g. opening 37, has been created in top wall 33 of runner 16 as revealed further in FIG. 4. Opening 37, and other openings, have been created by die cutting and scoring of sheet 30 (FIG. 5) to form slotted flaps 32a and 32b. Slotted flaps 32a and 32b can be folded downwardly and inwardly into runner 16 though opening 37 with the slots in flaps 32a and 32b traversing quarter-round cut-outs 26 and 28 until flaps 32a and 32b are oriented in a vertical position for providing additional strength to runner 16. It will be observed that quarter-round cut-outs 26 and 28 are very important as the outer edge of flaps 32a and 32b pivot around score lines 36 and 34, respectively, which necessarily makes them traverse an arc of a circle having its center along the score lines. Were cut-outs 26 and 28 missing, flaps 32a and 32b would not be able to be folded down into position after sheet 38 was folded into final configuration. Assembly clearly is rendered facile by the use of cut-outs 26 and 28. Note also that openings 21 and 23 can be seen to be die cut into the blank depicted at FIG. 5.

Figure 4:
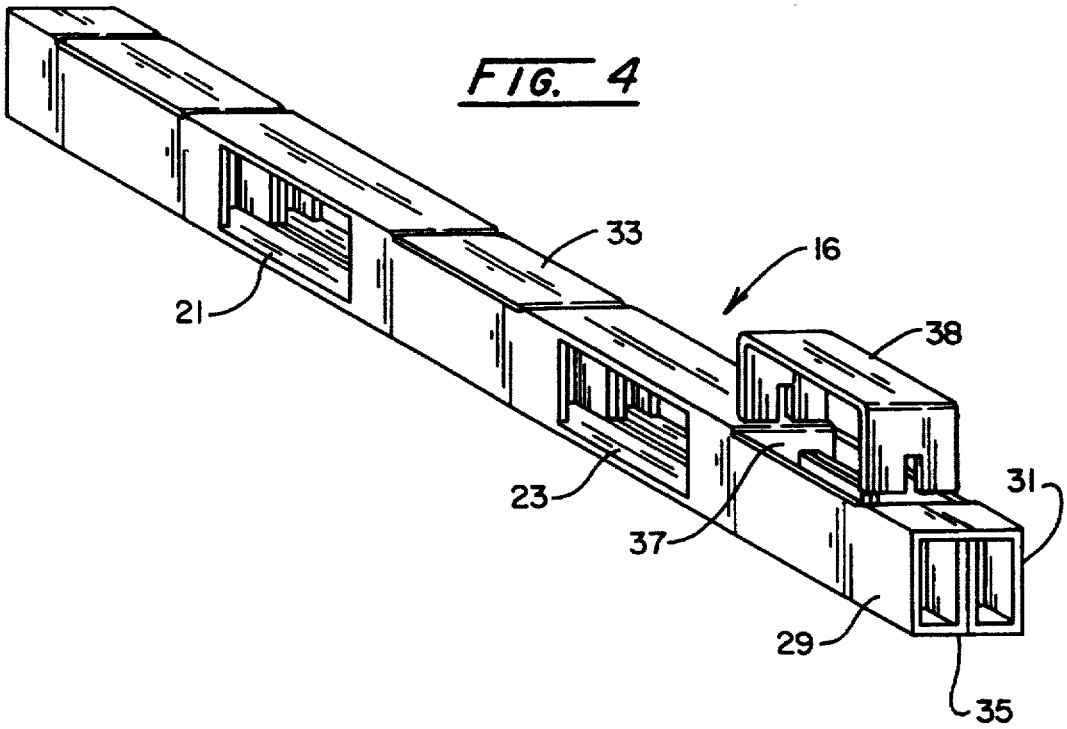
FIG. 4 is a top perspective view of one embodiment of the pallet runner of the present invention.
Figure 5:
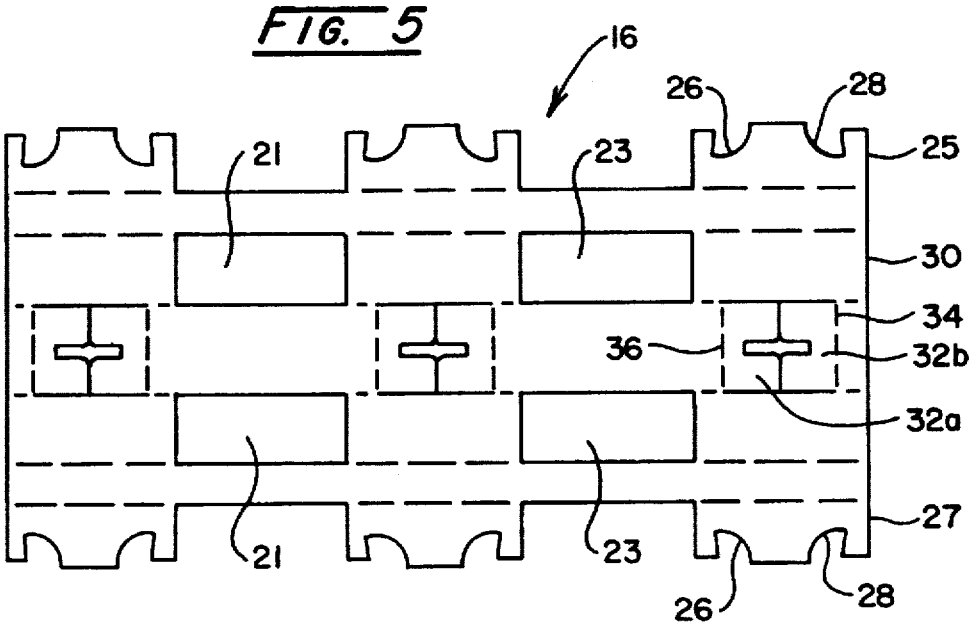
FIG. 5 is a plan view of the blank from which the pallet runner of FIG. 4 is formed.
Figure 6:
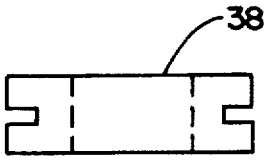
FIG. 6 is a plan view of the insert adapted to be used with the pallet runner of FIG. 4.

While the construction thus far described provides a runner highly suitable for construction of sturdy, durable pallets, additional strength (especially resistance to rolling or lateral deflection of the pallet) can be gained by use of insert 38 (FIGS. 4 and 6). Insert 38 is U-shaped and is formed to contain a pair of slotted ends which fit into the opening 37 created after flaps 32a and 32b are folded downwardly, and the slotted ends of insert 38 similarly engage central wall 24 just inwardly from flaps 32a and 32b. Additionally, the top surface of insert 38 gives runner 16 a continuous top without openings. Thus, a highly durable, unique, yet easy to assemble pallet and pallet runner have been disclosed. A double wall pallet constructed like that shown in FIGS. 1–5 without inserts like insert 38 was found to withstand a load of 16,860 pounds, while the addition of inserts like insert 38 increased the load capacity to 19,050 pounds.

Figure 7:
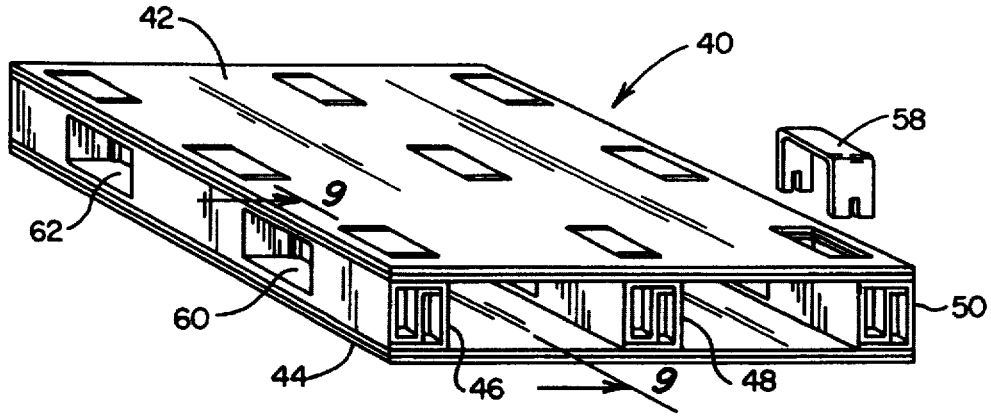
FIG. 7 is a top perspective view of another embodiment of the pallet of the present invention.
Figure 8:
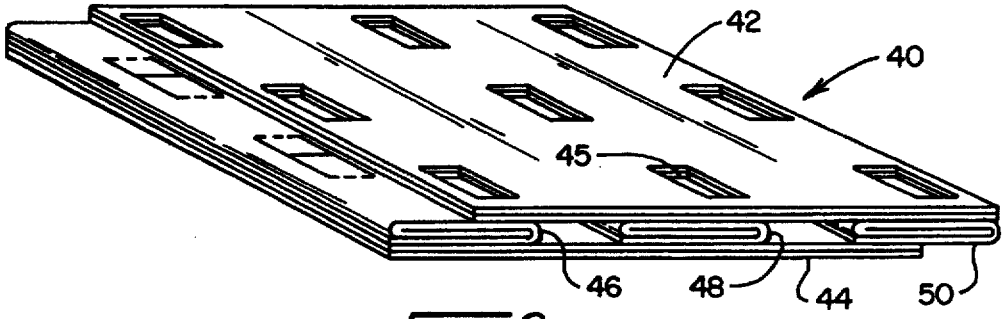
FIG. 8 is a top perspective view of the pallet of FIG. 7 in its collapsible position for transport and storage.

Pallet 8 is constructed at the plant and shipped to the customer in assembled form. Pallet 40 (FIGS. 7–14), however, is constructed for shipping and storage in collapsed form as depicted at FIG. 8. Pallet 40 can be seen to be composed of top deck 42 and bottom deck 44 which decks also are of double wall thickness in construction, though single wall, or additional wallpaper plies could be used as is necessary, desirable, or convenient. Pallet 40 can be seen to have interposed between decks 42 and 44, paperboard runners 46, 48, and 50. As with runner 16, the central vertical wall in runner 48 (typical of runners 46 and 50 also) contain quarter-round cut-outs 52 and 54 (FIG. 9) which enable flaps 56a and 56b (FIGS. 9 and 13) to be folded down into runner 48. In similar fashion, insert 58 with slotted ends also can be inserted though opening 45 (FIG. 8) for adding additional strength to pallet 40.

Figure 12:
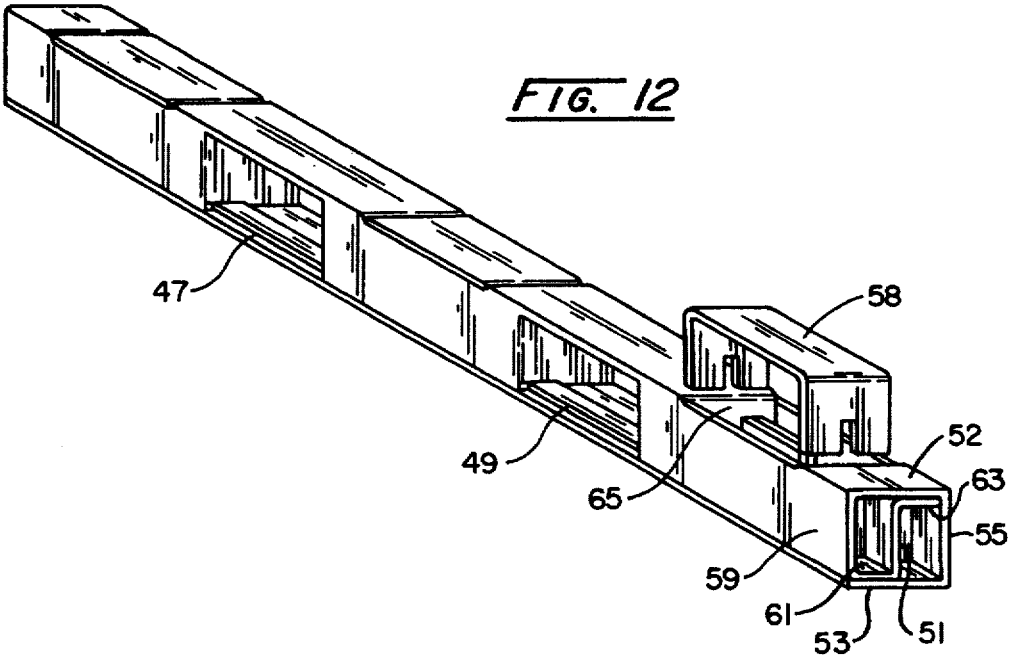
FIG. 12 is a top perspective view of the pallet runner used in constructing the novel pallet of FIG. 7.
Figure 13:
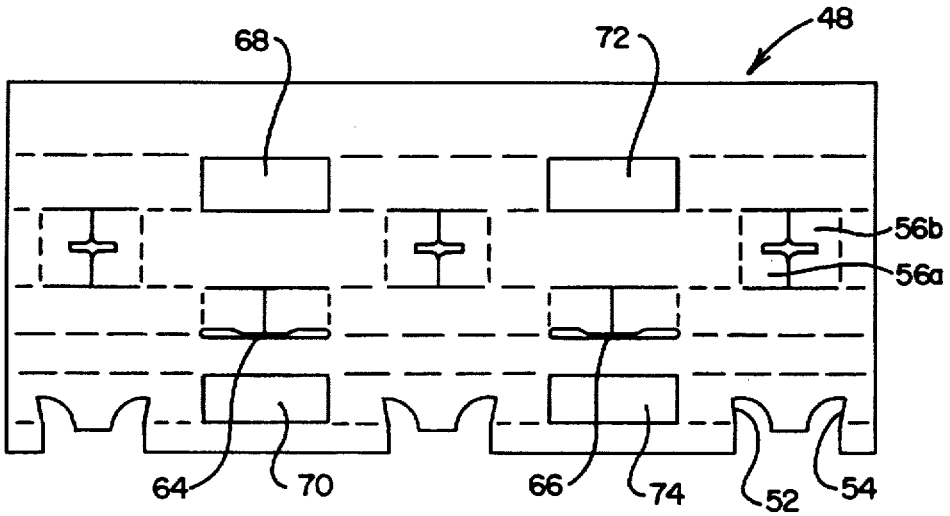
FIG. 13 is a plan view of the blank from which the pallet runner of FIG. 12 can be formed.

Because runner 48 is formed in a different manner than runner 16, central wall 51 is formed from only one end of the sheet as can be seen by reference to FIGS. 12 and 13. Bottom wall 53, sidewalls 55 and 59, and top wall 57 and formed from one end of the blank shown at FIG. 13, while the other end is folded into an S-shape for forming partial bottom wall 53 which lays flat against bottom wall 53, vertical wall 51, and partial top wall 63 which lays flat against top wall 57.

The pattern laid out for runner 48 in unassembled state as depicted at FIG. 13 reveals flaps 64 and 66 which are in juxtaposition with openings 68/70 and 72/74, respectively, and which can be opened manually or by a forklift which engages the side of runner 46 to open such flaps die cut in runner 48. Such flaps provide additional vertical structural support to paperboard pallet 40. Runner 48 may not have flaps 64 and 66 pushed inwardly to form openings depending upon the length of the forks of the forklift and the degree of insertion into pallet 40. Openings 60 and 62 in runner 46, however, will be opened if the forklift approached pallet 40 from the side. Similar flaps for forming forklift openings are provided in runner 50 to make pallet 48 a four-way pallet also.

Figure 9:
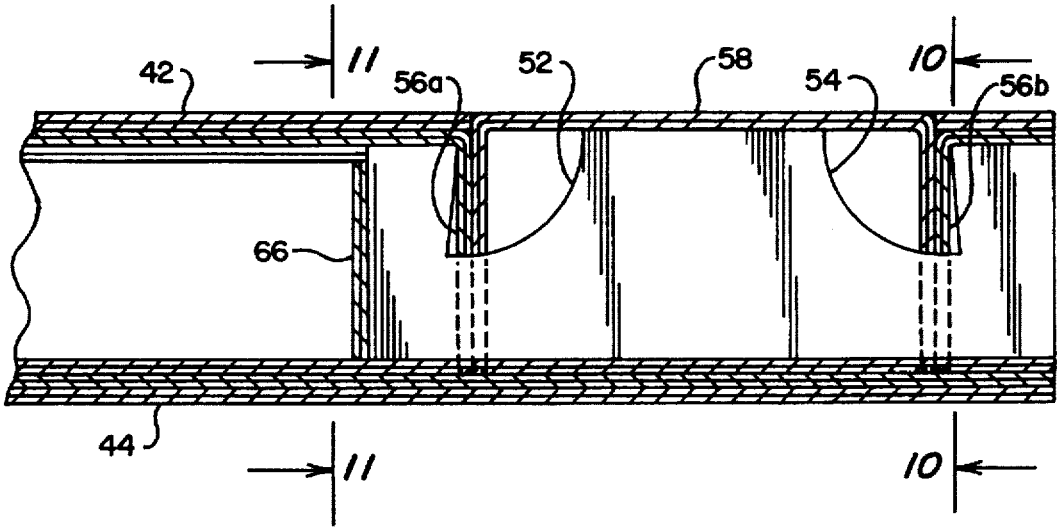
FIG. 9 is a cross-sectional elevational view taken along line 9—9 of FIG. 7.
Figure 10:
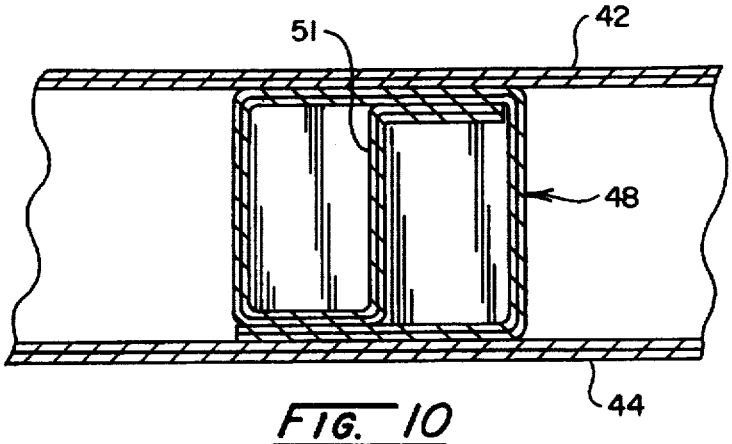
FIG. 10 is a cross-sectional elevational view taken along line 10—10 of FIG. 9.
Figure 11:
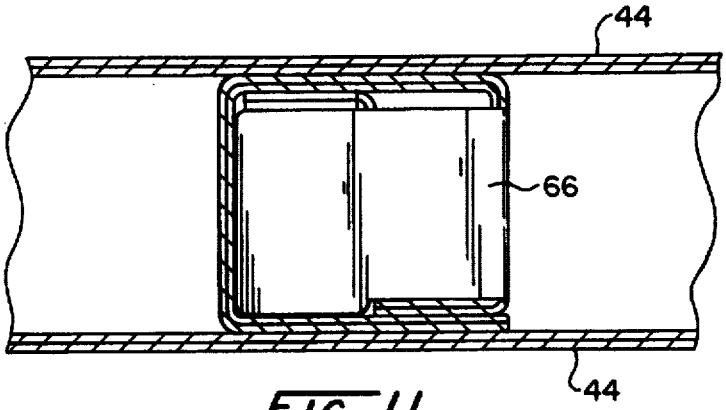
FIG. 11 is a cross-sectional elevational view taken along line 11—11 of FIG. 9.
Figure 14:
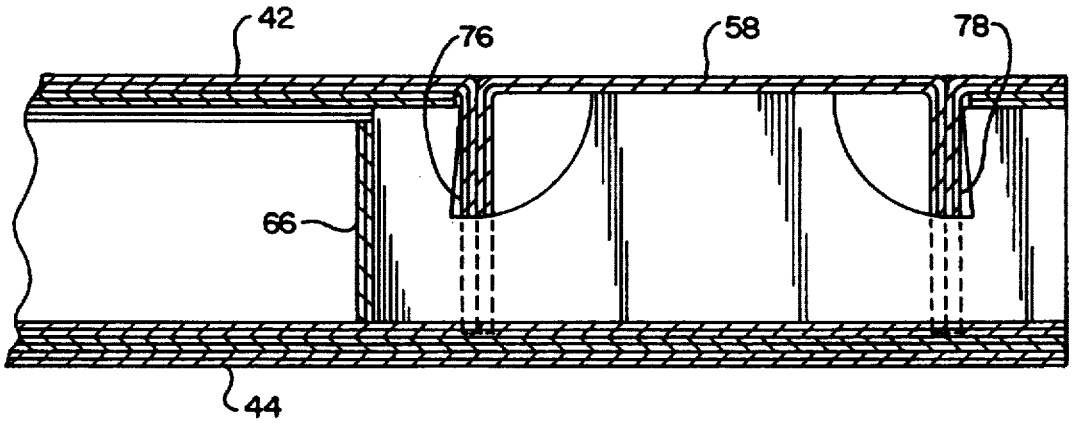
FIG. 14 is a cross-sectional elevational view like that of FIG. 9 but showing an alternative construction embodiment.

While FIG. 9 shows flaps 56a and 56b formed in top wall 57 of runner 48 being folded downwardly to engage central vertical wall 51, FIG. 14 shows an alternate embodiment wherein top deck 42 has been die cut and scored to create flaps 76 and 78 for folding down into opening 65 in runner 48 which has been die cut to remove flaps 56a and 56b to create an opening top wall 57. Thus, collapsible pallet 40 can be held in an assembled, rigid condition as depicted at FIG. 7 by folding flaps down from the top wall of runner 48, insert 58, or top deck 42, or even combinations thereof.

Figure 15:
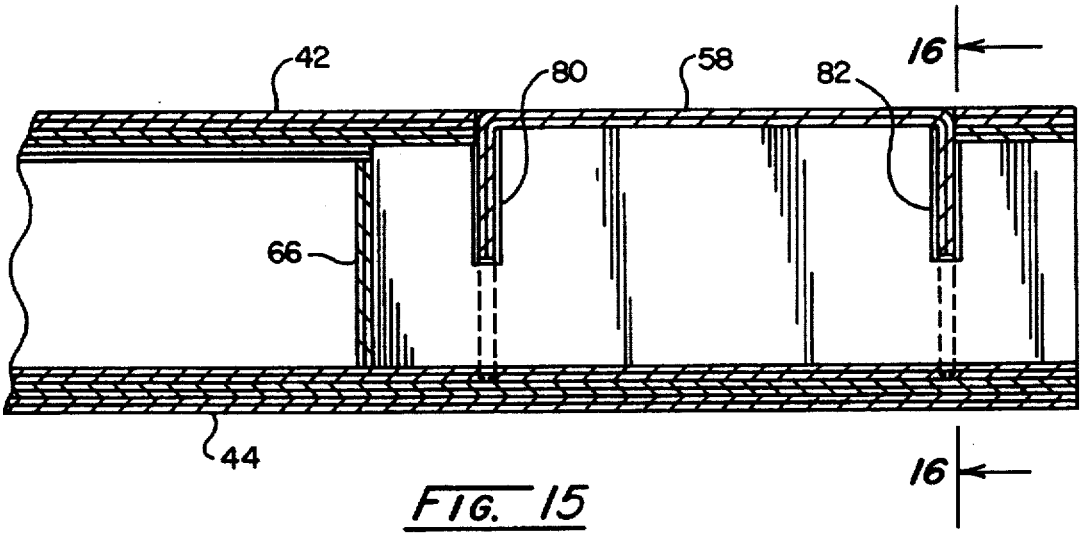
FIG. 15 is a cross-sectional elevational view, like that of FIGS. 9 and 14, but showing yet another pallet runner embodiment.
Figure 16:
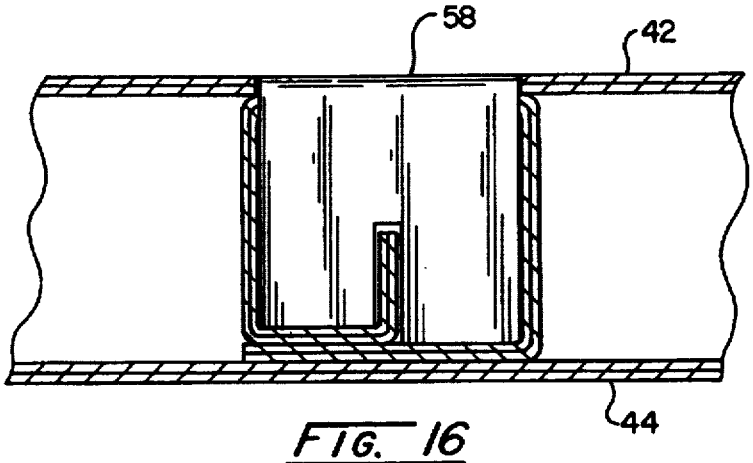
FIG. 16 is a cross-sectional elevational view taken along line 16—16 of FIG. 15.

An alternative construction for collapsible runner 40 is set forth at FIGS. 15 and 16. In this instance, inserts 58 fit into vertical slots 80 and 82 which are cut into central wall 51. In such embodiment, however, flaps from top deck 42 and from top wall 57 of runner 48 cannot be present as quarter-round cut-outs 52 and 54 are absent and have been replaced by slots 80 and 82. Such embodiment is not as facile to assemble from its dormant state as depicted at FIG. 8 to its assembled state at FIG. 7, though such embodiment clearly is within the precepts of the present invention.

It will be appreciated that additional modifications and changes may be made to the pallet runners and pallets disclosed herein, yet such changes still are within the spirit and precepts of the invention disclosed herein and are considered to be part of the disclosure and invention disclosed and claimed herein.

We claim:

1. A paperboard blank having an outer periphery defining a width and a longitudinal extent and configured for foldable assembly into a runner having a top wall with at least one opening of a given width and longitudinal extent, a pair of parallel side walls perpendicular to said top wall, a bottom wall parallel to said top wall, a central wall parallel to and intermediate said side walls, and at least two flaps disposed perpendicular to said central wall at opposite longitudinal ends of said top wall opening and having central slots configured for retaining said central wall therewithin, said flaps selected from (a) flaps [provided with] *formed from* said runner top wall, (b) flaps provided with an upper deck attached to said runner, (c) flaps provided with [a rectangular] *an* insert which has a pair of end slotted flaps which insert fits into said top wall opening with said end slotted flaps folding downwardly over said central wall, or (d) combinations thereof, said blank comprising:

a central pair of parallel fold lines disposed in a spaced apart relationship to define therebetween a top wall portion for forming said top wall, said top wall portion having at least one opening portion for forming said top wall opening;

a second pair of parallel fold lines spaced outwardly from and parallel to said central pair of parallel fold lines to define therewith a pair of side wall portions for forming said side walls;

a third pair of parallel fold lines spaced outwardly from and parallel to said second pair of parallel fold lines intermediate said outer periphery to define with said second pair of parallel fold lines a pair of bottom wall portions for forming said bottom wall and to define with said outer periphery a pair of central wall portions for forming said central wall, said central wall portions each having a pair of [quarter-round] cut-outs disposed for mutual registry at the longitudinal ends of said top wall opening and configured to enable the folding of said flaps over said central wall.

2. The paperboard blank of claim 1 which additionally has openings in each of said sidewall portions disposed for registry so that the fork of a forklift can penetrate therethrough.

3. The paperboard blank of claim 1 wherein said flaps are [provided with] *formed from* said runner top wall portion.

4. The paperboard blank of claim 1 wherein said flaps are [provided with a rectangular] *formed from an* insert which has a pair of end slotted flaps which insert fits into said top wall portion opening, said end slotted flaps folding downwardly into said [ quarter-round] cut-outs.

5. A paperboard pallet comprising a top deck and bottom deck having multiple runners interposed therebetween and attached thereto, said runners comprising a sheet of paperboard that has been folded into a rectangular form by (a) one end being folded to form a first bottom wall, a first side wall, a first top wall, and a second side wall; and (b) the other end being folded in an "S" configuration to form a central vertical wall, a part second top wall which lays against said first top wall, and a part second bottom wall which lays against said first bottom wall;

said top wall having openings, [ said central vertical wall having quarter-round cutouts located at the longitudinal ends of said top wall openings;] said top wall openings receiving flaps which have central slots cut in them, said flaps selected from (a) flaps [provided with] *formed from* said runner top wall, (b) flaps provided with an upper deck attached to said runner, (c) flaps provided with [ a rectangular] *an* insert which has a pair of end slotted flaps which insert fits into said top wall opening with said end slotted flaps folding downwardly into said [ quarter-round cut-outs] *central wall,* or (d) combinations thereof.

6. The paperboard pallet of claim 5 wherein said flaps are not engaged in said central wall [ quarter-round cut-outs] so that said pallet is in a collapsed state.

7. The paperboard pallet of claim 5 wherein said flaps are engaged in said central wall [quarter-round cut-outs] so that said pallet is in a rigid formed state for use.

8. The paperboard pallet of claim 5 which additionally has openings in each of said sidewalls disposed in registry so that the fork of a [forklike] *forklift* penetrate therethrough.

9. The paperboard pallet of claim 5 wherein said flaps are [provided with] *formed from* said runner top wall.

10. The paperboard pallet of claim 5 wherein said flaps are [provided with a rectangular] *formed from an* insert which has a pair of end slotted flaps which insert fits into said top wall cut-out with said end slotted flaps folding downwardly into said [ quarter-round cutouts] *central wall.*

11. The paperboard pallet of claim 5 wherein said flaps are a combination of (a) and (c).

12. The paperboard pallet of claim 5 wherein [U-shaped] inserts having a pair of oppositely-disposed, end slotted flaps are inserted into said top wall openings and said slotted flaps engage said central wall [quarter-round cut-outs].

13. A paperboard pallet comprising an upper deck and a lower deck having a plurality of runners interposed therebetween and affixed to each of said sheets, each of said runners comprising a sheet of paperboard that has been folded into a rectangular form having top and bottom walls, a pair of side walls, and a central vertical wall interposed between said side walls; the top wall having cut-out areas, the central wall having slots located at the longitudinal ends of said top wall cut-out areas; said top wall cut-out areas receiving [ a U-shaped] *an* an insert which has a pair of end slotted flaps which insert fits into said top wall cut-out area with said end slotted flaps folding downwardly into said central wall slots.

14. A paperboard runner, suitable for use in forming a paperboard pallet composed of a top and bottom sheet having multiple runners interposed therebetween and attached thereto, which comprises: a sheet of paperboard that has been folded into a rectangular form having top and bottom walls, a pair of side walls, and a central vertical wall [provided with] *formed from* ends of said sheet and interposed between said side walls; the top wall having openings, [ the central wall having quarter-round cut-outs located at the longitudinal ends of said top wall openings;] said top wall openings receiving flaps having central slots cut in them, said flaps a combination of (a) flaps [provided with] *formed from* said runner top wall, and (b) flaps provided with [a rectangular] *an* insert which has a pair of end slotted flaps which insert fits into said top wall opening with said end slotted flaps folding downwardly into said [ quarter-round cut-outs] *central wall.*

15. A paperboard runner, suitable for use in forming a paperboard pallet composed of a top and bottom sheet having multiple runners interposed therebetween and attached thereto, which comprises:

a sheet of paperboard that has been folded into a rectangular form having top and bottom walls, a pair of side walls, and a central vertical wall [provided with] *formed from* ends of said sheet and interposed between said side walls; the top wall having openings, [ the central wall having quarter-round cut-outs located at the longitudinal ends of said top wall openings;] said top wall openings receiving flaps having central slots cut in them, said flaps selected from (a) flaps [provided with] *formed from* said runner top wall, (b) flaps provided with an upper deck attached to said runner, (c) flaps provided with [a rectangular] *an* insert which has a pair of end slotted flaps which insert fits into said top wall opening with said end slotted flaps folding downwardly into said [ quarter-round cut-outs] *central wall,* or (d) combinations thereof; and

[ U-shaped] inserts having a pair of oppositely disposed slotted flaps inserted into said top wall openings, said slotted flaps engaging said central wall [ quarter-round cut-outs].

16. A paperboard pallet comprising an upper deck and a lower deck having a plurality of runners interposed therebetween and affixed to each of said decks, each of said runners comprising a sheet of paperboard that has been folded into a rectangular form having top and bottom walls, a pair of side walls, and a central vertical wall interposed between said side walls; the top wall having openings, [ the central wall having quarter-round cut-outs located at the longitudinal ends of said top wall openings;] said top wall openings receiving flaps having central slots cut in them, said flaps a combination of (a) flaps [provided with] *formed from* said runner top wall, and (b) flaps provided with [ a rectangular] *an* insert which has a pair of end slotted flaps which insert fits into said top wall opening with said end slotted flaps folding downwardly into said [ quarter-round cut-outs] *central wall.*

17. A paperboard pallet comprising:

an upper deck;

a lower deck;

a plurality of runners interposed between and affixed to each of said decks, each of said runners comprising a sheet of paperboard that has been folded into a rectangular form having top and bottom walls, a pair of side walls, and a central vertical wall interposed between said side walls; the top wall having openings, [ the central wall having quarter-round cut-outs located at the longitudinal ends of said top wall openings;] said top wall openings receiving flaps having central slots cut in them, said flaps selected from (a) flaps [provided with] *formed from* said runner top wall; (b) flaps provided with an upper deck attached to said runner; (c) flaps provided with [ a rectangular] *an* insert which has a pair of end slotted flaps which insert fits into said top wall opening with said end slotted flaps folding downwardly into said [quarter-round cut-outs] *central wall,* or (d) combinations thereof; and

[ U-shaped] inserts having a pair of oppositely-disposed, end slotted flaps inserted into said top wall openings, said slotted flaps engaging said central wall [ quarter-round cut-outs].

* * * * *